United States Patent [19]

Poupard

[11] Patent Number: 4,568,069
[45] Date of Patent: Feb. 4, 1986

[54] ELASTICALLY YIELDABLE MOUNT, IN PARTICULAR FOR THE SUSPENSION OF A VEHICLE ENGINE

[75] Inventor: Dominique Poupard, Chaville, France

[73] Assignees: Automobiles Peugeot; Automobiles Citroen, both of Paris, France

[21] Appl. No.: 697,693

[22] Filed: Feb. 4, 1985

Related U.S. Application Data

[63] Continuation of Ser. No. 402,366, Jul. 27, 1982, abandoned.

[30] Foreign Application Priority Data

Aug. 7, 1981 [FR] France ............................ 81 15355

[51] Int. Cl.⁴ ............................................. F16F 9/10
[52] U.S. Cl. ................................ 267/140.1; 248/562
[58] Field of Search ................. 188/298; 267/140.1, 267/141, 141.1, 141.2, 141.3, 141.4, 141.5, 141.6, 141.7, 153; 248/562, 632, 634, 638; 280/716

[56] References Cited

U.S. PATENT DOCUMENTS

| | | | |
|---|---|---|---|
| 2,226,388 | 12/1940 | Richter | 74/607 |
| 2,819,032 | 1/1958 | Defrie et al. | 267/153 X |
| 3,314,631 | 4/1967 | Whitehill | 267/141 |
| 3,731,771 | 5/1973 | Borgo | 188/289 |
| 3,795,390 | 3/1974 | Kendall et al. | 267/33 |
| 4,054,277 | 10/1977 | Sirven | 267/35 |
| 4,159,091 | 6/1979 | LeSalver | 267/140.1 X |
| 4,215,842 | 8/1980 | Brenner et al. | 248/562 |
| 4,262,886 | 4/1981 | Le Salver | 267/141 X |
| 4,277,056 | 7/1981 | Ticks | 267/140.1 |
| 4,378,936 | 4/1983 | Brenner | 267/141.1 X |
| 4,391,435 | 7/1983 | Thom | 188/298 X |
| 4,399,987 | 8/1983 | Cucelli et al. | 267/140.1 |
| 4,401,298 | 8/1983 | Eaton et al. | 267/141.1 X |
| 4,418,895 | 12/1983 | Bertin et al. | 267/140.1 |
| 4,422,779 | 12/1983 | Hamaekers et al. | 384/99 |
| 4,458,888 | 7/1984 | Wolf et al. | 267/140.1 |
| 4,469,316 | 9/1984 | den Boom et al. | 248/562 X |

FOREIGN PATENT DOCUMENTS

| | | | |
|---|---|---|---|
| 473824 | 5/1951 | Canada | 267/141.3 |
| 547194 | 2/1934 | Fed. Rep. of Germany . | |
| 728501 | 11/1942 | Fed. Rep. of Germany . | |
| 2819306 | 1/1979 | Fed. Rep. of Germany | 267/153 |
| 642711 | 5/1928 | France | 188/298 |
| 1242350 | 8/1960 | France . | |
| 1336186 | 7/1963 | France . | |
| 2467724 | 4/1981 | France . | |
| 811748 | 4/1959 | United Kingdom . | |
| 2041485 | 9/1980 | United Kingdom | 267/140.1 |

*Primary Examiner*—George E. A. Halvosa
*Attorney, Agent, or Firm*—Burns, Doane, Swecker & Mathis

[57] ABSTRACT

In this mount, the two liquid-containing chambers (15, 16) are separated by a single-piece member (10) of elastomer which comprises a central movable portion (13) connected to a massive peripheral portion (11) by a thin web (12) in the form of a circular wave. Defined between the periphery of the peripheral portion (11) and the end elements (4, 7) of the mount is a circular passageway (19) which has an extent of more than a turn and connects the two chambers to each other. This mount is easy to construct and ensures both a good filtering of high-frequency and small amplitude vibrations due to imperfections in the balancing of the engine and a good damping of low-frequency and large amplitude trembling coming from the road.

5 Claims, 8 Drawing Figures

ELASTICALLY YIELDABLE MOUNT, IN PARTICULAR FOR THE SUSPENSION OF A VEHICLE ENGINE

This application is a continuation of application Ser. No. 402,366, filed July 27, 1982, now abandoned.

DESCRIPTION

The invention relates to an elastically yieldable mount for connecting to a rigid support an element or an assembly on which excitations of different types are exerted. By way of an example of application, these mounts are more particularly adapted to the suspension of a heat engine with respect to the structure of an automobile vehicle.

It is known that on an automobile vehicle the elastically yieldable mounts employed for the suspension of the engine must ensure both a good filtering of the high-frequency and low amplitude vibrations due to imperfections in the balancing of the engine and a good damping of the low-frequency and large amplitude trembling coming from the road.

This double result is achieved with a mount of the type comprising two chambers filled with liquid and defined at least partly by elastically yieldable walls and separated by a partition will comprising a movable part which is capable of very easily moving between two extreme positions in a direction perpendicular to the mean plane of the moving part, means for limiting the displacements of the movable part to said extreme positions, and a passageway of great length and small section which puts the two chambers in communication with each other.

An elastically yieldable mount of this type is disclosed in the French patent application No. 2 467 724. In this known mount, the movable part of the partition wall is formed by a member which comprises a massive, roughly undeformable, centre portion and a thin and flexible peripheral portion which is gripped between two rigid elements which constitute the fixed outer part of the partition wall. These two rigid elements carry means for limiting the movement of the movable portion and define therebetween the passageway of great length (for example a passageway having a length 20 to 50 times the diameter of its section, as disclosed in said French patent application) which interconnects the two chambers.

This arrangement has the drawback of employing for forming the partition three members which must be assembled manually, immersed in the liquid provided for filling the chambers of the mount so as to avoid formation of air bubbles.

An object of the invention is to simplify this known structure so as to avoid such an assembling operation. For this purpose, the invention provides a mount of the aforementioned type, wherein the partition and the movable part thereof are made from a single member of an elastomeric material including the means for limiting the displacements of the movable part.

The construction of said member by moulding is facilitated when the passageway of great length is defined partly by a peripheral recessing of the partition and partly by end elements of the mount which surround the peripheral part of the partition.

According to a first embodiment of the invention, the partition comprises a massive peripheral portion which is but little deformable and is connected to the centre movable portion by a thin web forming at least one circular wave.

According to another embodiment of the invention, the partition comprises a massive peripheral portion which is but little deformable and a movable centre portion formed by a series of slabs of elastomer separated by narrow grooves, said slabs being interconnected and connected to the peripheral portion by a thin web.

Embodiments will be described in the ensuing description with reference to the accompanying drawings in which.

Figure 1:
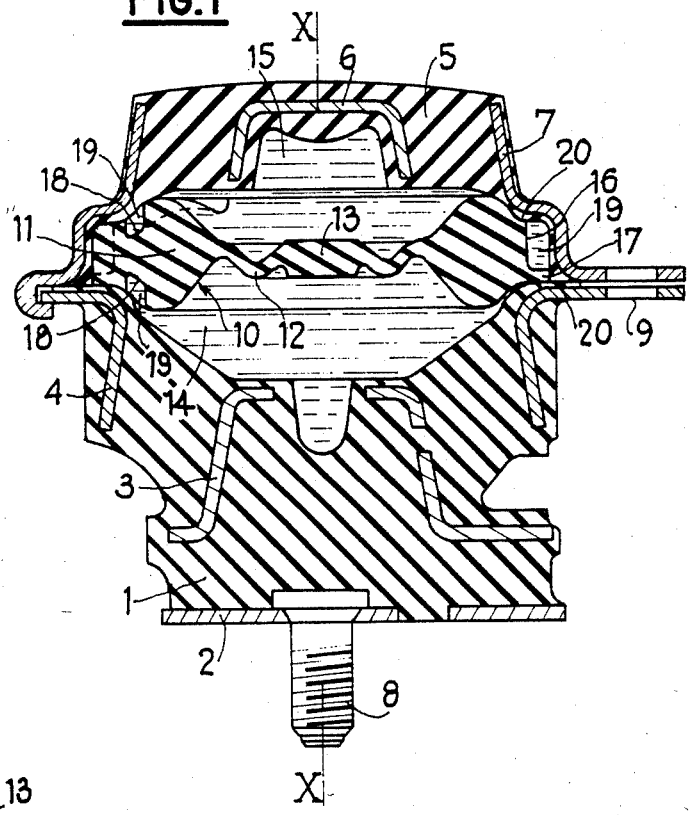
FIG. 1 is an axial sectional view of a mount according to the invention.
Figure 2:
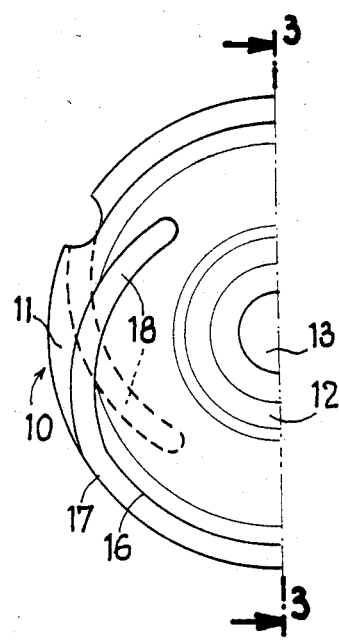
FIG. 2 is a partial plan view of the separating partition of the mount shown in FIG. 1.

The mount shown in FIGS. 1 and 2, which is mainly of revolution about an axis X—X, comprises in particular, on one hand, a block of elastomer 1 bonded or vulcanised to three armatures 2, 3, 4, namely a centre armature 3 and two end armatures 2 and 4, and, on the other hand, a block of elastomer 5 bonded or vulcanised to two armatures 6 and 7, namely an inner armature 6 and an end armature 7.

The armature 2 is adapted to be fixed to the structure of an automobile vehicle by means of a screw 8 and the armatures 4 and 7, which are fixed to each other for example by a setting operation, are adapted to be connected to the engine (not shown) of the vehicle in the region of fixing orifices 9.

A single-piece inner partition 10 of rubber or a flexible plastics material (for example polyurethane), comprises a massive peripheral portion 11 clamped between the armatures 4 and 7. This peripheral portion is connected by a thin annular region 12 in the form of a circular wave or corrugation to a thicker centre disc 13 which constitutes a portion which is movable in a direction perpendicular to its mean plane, ie. along the axis X—X.

The partition 10 defines with the elastomeric block 1, a first chamber 14, and, with the elastomeric block 5, a second chamber 15. Both chambers are filled with liquid.

In about three quarters of its circumference, the peripheral portion 11 comprises a cylindrical recess 16 at one end of which is defined a radial flange 17. This recess is extended at each end by a helical groove 18 which extends over about a quarter of a turn and opens out on an end side of the partition 10.

When the mount is assembled, the armatures 4 and 7 define with the recess 16, the flange 17 and the two grooves 18, a continuous peripheral space 19 which forms a circular passageway of great length and small section interconnecting the two chambers 14 and 15, this passageway having an extent of a little more than one turn. The flange 17 facilitates the centering of the partition 10.

It is desirable that, as shown, the portions of the armatures 4 and 7 in contact with the partition 10 be covered with a thin layer of elastomer 20 which is bonded or vulcanised at the same time as the corresponding block 1 or 5.

The mount just described operates in the manner of that disclosed in the aforementioned French patent application No. 2,467,724.

In respect of small amplitudes of vibration, the centre disc 13 is free to move owing to the free curved bending deformation of the annular region 12. The mount then has a very low stiffness which ensures an excellent filtering of the high-frequency vibrations produced by the engine.

The displacement of the centre disc 13 is practically stopped when the circular wave forming the annular region 12 is deployed, the material then working under tensile stress. The liquid must then pass from one chamber to the other by way of the passageway 19. Consequently, there is a great increase in the stiffness and in the damping which facilitates reducing the trembling of large amplitude and low-frequency coming from the state of the road.

Figure 3:
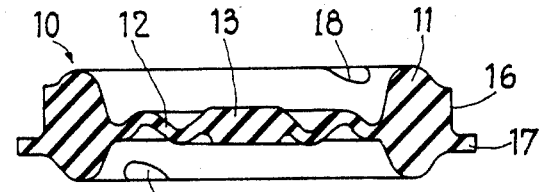
FIGS. 3 and 4 are sectional views taken on a line corresponding to line 3—3 of FIG. 2 of two modifications of said partition.

The partition shown in FIG. 3 differs from the preceding partition only by the presence of two circular waves or corrugations in the annular region 12 which connects the peripheral portion 11 to the centre disc 13.

Figure 4:
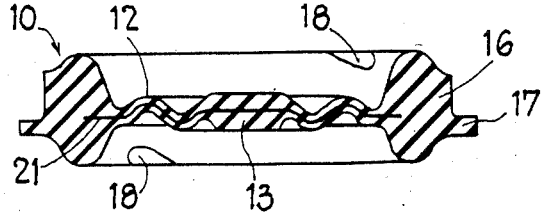

The partition shown in FIG. 4 is similar to the preceding partition but is made from rubber reinforced by a fabric 21 of plastic fibres or of fine metal cloth. This reinforcement freely deforms in a direction perpendicular to its general plane, ie. in the direction X—X, until the waves or corrugations forming the annular region 12 are deployed.

Figure 5:
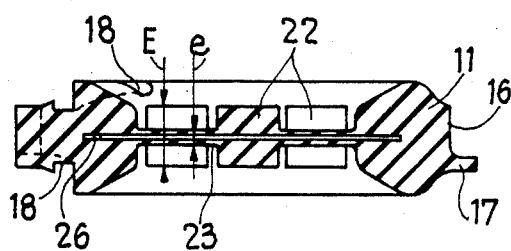
FIG. 5 is a sectional view taken on line 5—5 of FIG. 6 of another modification of the separating partition.

The partition shown in FIG. 5 is also made from reinforced rubber. It only differs from that of FIGS. 1 to 4 in that its movable centre portion is formed by a series of slabs 22 which cover a circular region and symmetrically project from the two sides of a thin web 23. These slabs 22 are separated from each other by radial grooves 24 and circular grooves 25 of small width.

In this embodiment, the movable portion deforms easily in the direction X—X by a curved bending thereof until the edges of the slabs 22 come into mutual contact on the concave side. The thickness of bent rubber increases then suddenly and results practically in a stoppage of the displacement. For example, if e represents the thickness of the rubber at the bottom of the grooves, ie. the thickness of the web 23, and E the thickness in the region of the slabs 21, it is preferable to arrange $E \geq 3\,e$, it being possible to arrange that the width of the grooves be of the order of a millimeter.

Figure 7:
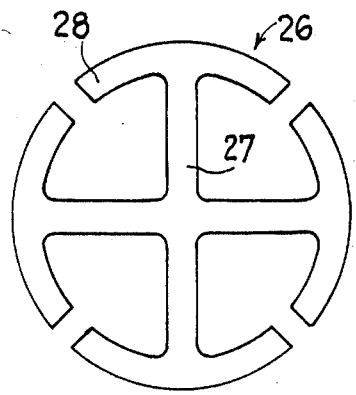
FIG. 7 is a plan view of a reinforcement of use in the partition shown in FIGS. 5 and 6.
Figure 6:
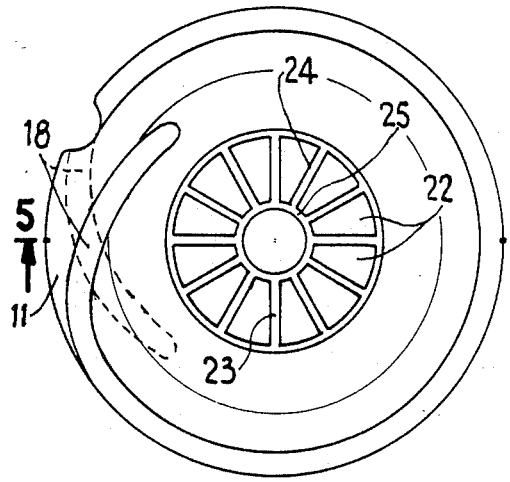
FIG. 6 is a plan view of the partition shown in FIG. 5.

FIG. 7 shows a reinforcement 26 made from foil and of utility with the partition of FIGS. 5 and 6. The cutting out of this foil is arranged so that it be capable of deforming with small forces in a direction perpendicular to its plane. For this purpose, it is formed with radial arms 27 embedded in the web 23 and terminating in sections of a ring 28 which act as the anchoring in the peripheral portion 11 of the partition.

Figure 8:
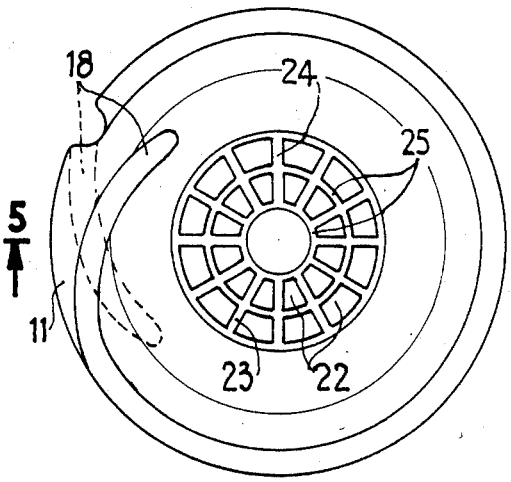
FIG. 8 is a plan view of a modification of the partition shown in FIGS. 5 and 6.

The partition shown in FIG. 8 differs from the preceding partition only by the presence of an additional circular groove 25.

Thus in each of the embodiments described hereinbefore, the mount is easy to assemble owing to the construction of the partition 10 in a single piece and the limitation of the displacement of the centre portion of this partition is ensured by a simple sudden reduction in the flexibility in the direction X—X.

Having now described my invention what I claim as new and desire to secure by Letters Patent is:

1. An elastically yieldable mount comprising in combination a pair of elements each including an elastically yieldable wall, a partition of elastomeric material disposed between the elements, each element and the partition at least partly defining one of two chambers filled with liquid, the partition separating the two chambers in a fluidtight manner, and means defining a passageway which puts the two chambers in communication with each other and has a ratio of length to diameter of cross-section which is a sufficiently high multiple of one to damp low-frequency large amplitude movements to which the mount is subjected in use, the partition also being operable to damp high frequency low amplitude movements to which the mount is subject and having an annular outer peripheral portion fixed in position between the pair of elements, a centre portion having a substantial thickness and an annular intermediate web portion integrally connecting the outer peripheral portion to the centre portion, the outer peripheral portion, the web portion and the centre portion being substantially in a common plane, the web portion being thinner than the outer peripheral portion, thinner than the centre portion and having a radial length which exceeds the radial distance between the centre portion and the peripheral portion so that at least one annular corrugation exists extending circumferentially substantially in said common plane so that the web portion is more flexible than the outer peripheral portion to allow the centre portion a limited freedom of movement in a direction perpendicular to said common plane, and means for limiting said freedom of movement between an upper limit position and lower limit position of the centre portion in which limit positions the centre portion is spaced from the pair of elements, which limiting means consist of the radial length to which said corrugation is capable of being elastically deformed in a free and unhindered manner as the centre portion moves above and below the common plane.

2. A mount according to claim 1, wherein said passageway is defined partly by a peripheral recess in the partition, and partly by opposed end elements of the mount which are disposed on opposite sides of said common plane and surround the peripheral portion of the partition.

3. A mount according to claim 2, wherein the recess has an extent in plan of almost the whole of the circumference of the partition and is extended at each end by a substantially helical groove which extends away from said common plane and opens onto one of the two chambers.

4. A mount according to claim 1, wherein the centre portion and the web portion include a reinforcement which is deformable in a direction perpendicular to said common plane.

5. An elastically yieldable mount comprising in combination elastically yieldable walls at least partly defining two chambers filled with liquid, a partition separating the two chambers in a fluidtight manner and means defining a passageway which puts the two chambers in communication with each other and has a ratio length/diameter of cross-section which is a sufficiently high multiple of one to damp low-frequency large amplitude movements to which the mount is subjected in use, the partition also being operable to damp high frequency, low amplitude movements and having an annular outer peripheral portion fixed in position relative to said yieldable walls, a centre portion and an annular intermediate web portion which connects the outer peripheral portion of the centre portion, the outer peripheral portion, the web portion and the centre portion being substantially in a common plane and in one piece and the partition being of an elastomeric material, the centre portion and the web portion including a plurality of blocks projecting above and below the common plane, the blocks being separated by radial and circumferential grooves so that mutual contact of edges of the blocks limits deflection of the centre and web portion perpendicular to the common plane and so that the centre portion has limited freedom of movement in a direction perpendicular to said common plane between an upper limit and lower limit which limits are determined by the mutual contact of block edges, and said passageway being defined partly by a peripheral recess in the peripheral portion of the partition and partly by end elements of the mount which are disposed on opposite sides of the partition and surround the peripheral portion of the partition.

* * * * *